June 29, 1954     W. BRIGHT     2,682,427
REMOVABLE COLLAPSIBLE VEHICLE DOOR CONSTRUCTION
Filed April 21, 1951     3 Sheets-Sheet 1
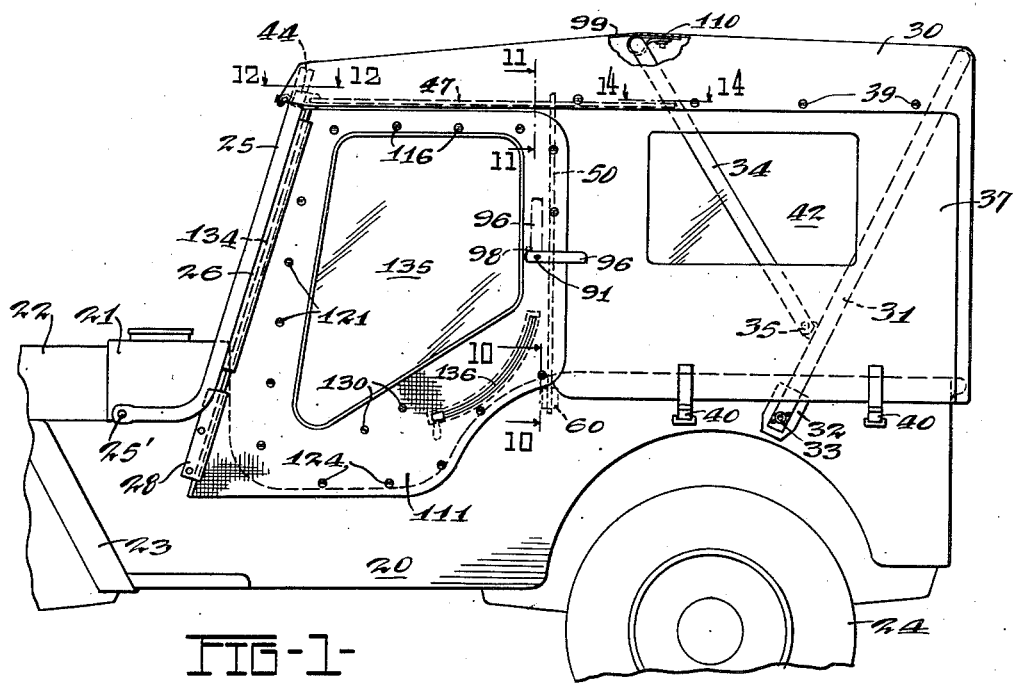
FIG-1-
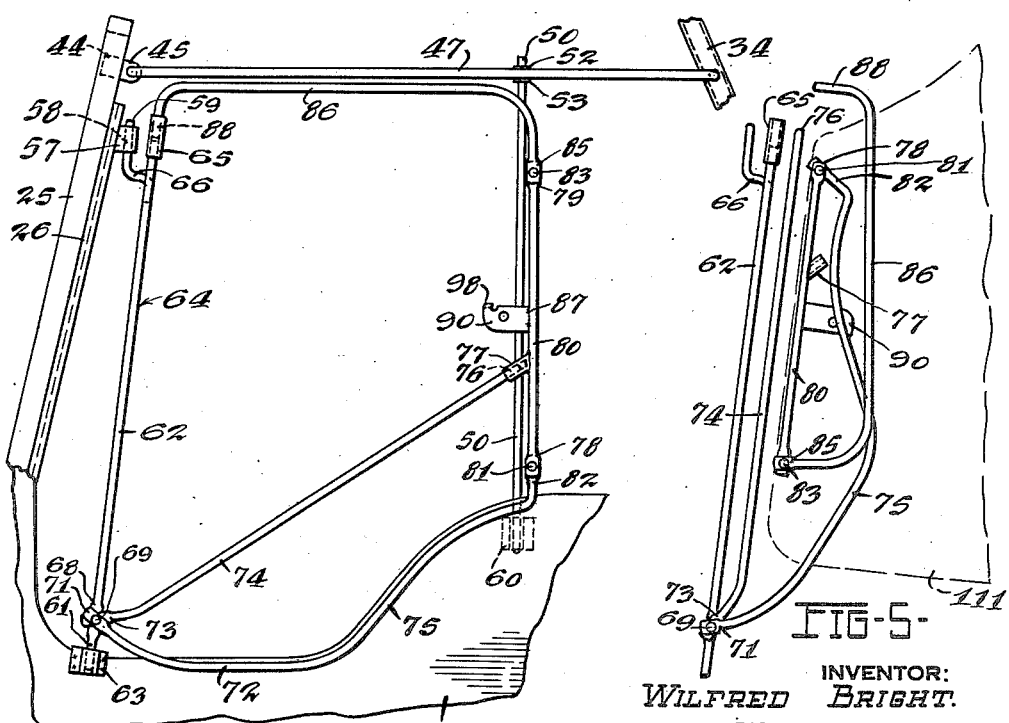
FIG-2-
FIG-5-
INVENTOR:
WILFRED BRIGHT.
BY
Harry O. Ernsberger
ATTORNEY June 29, 1954 W. BRIGHT 2,682,427
REMOVABLE COLLAPSIBLE VEHICLE DOOR CONSTRUCTION
Filed April 21, 1951 3 Sheets-Sheet 2
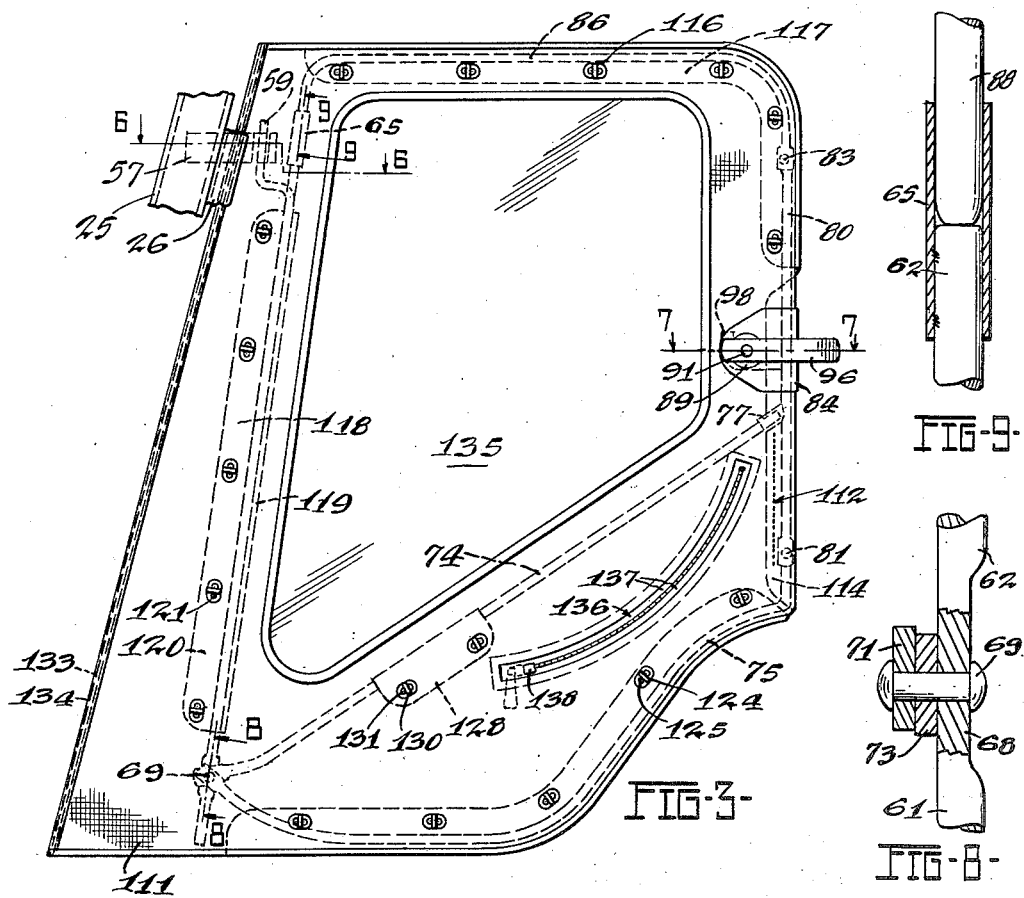
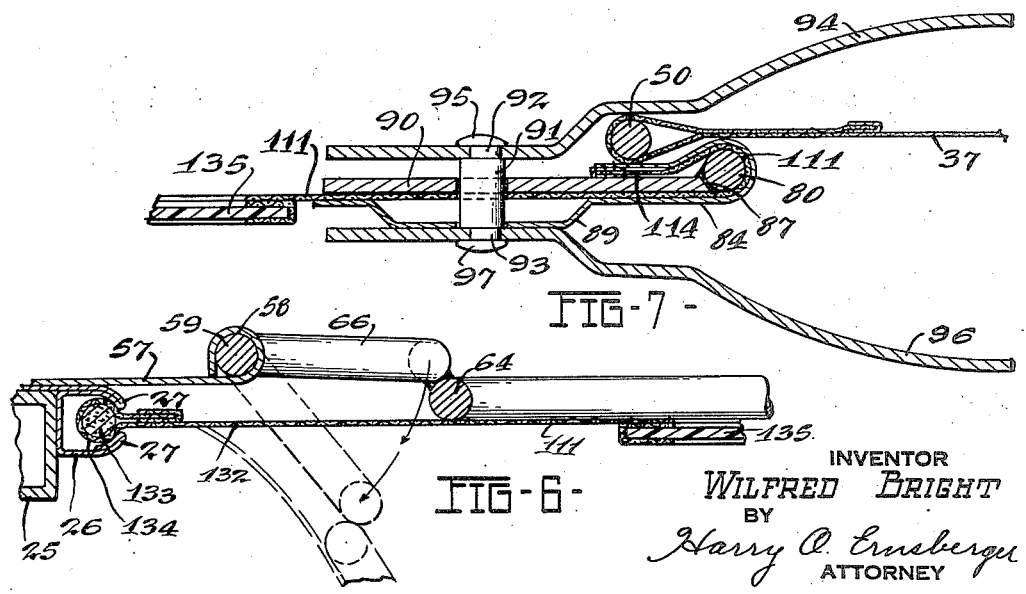
INVENTOR
WILFRED BRIGHT
BY
Harry O. Ernsberger
ATTORNEY June 29, 1954     W. BRIGHT     2,682,427
REMOVABLE COLLAPSIBLE VEHICLE DOOR CONSTRUCTION
Filed April 21, 1951     3 Sheets-Sheet 3
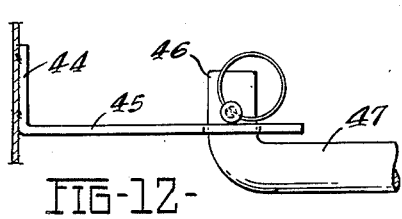
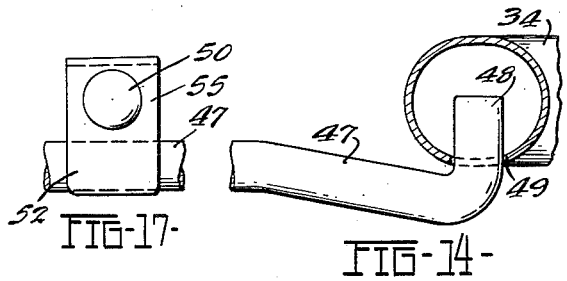
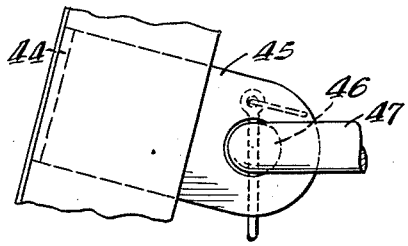
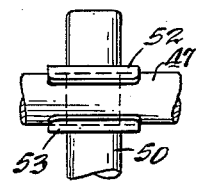
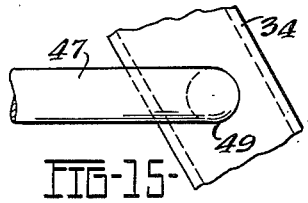
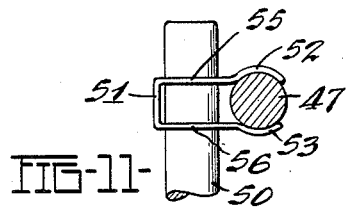
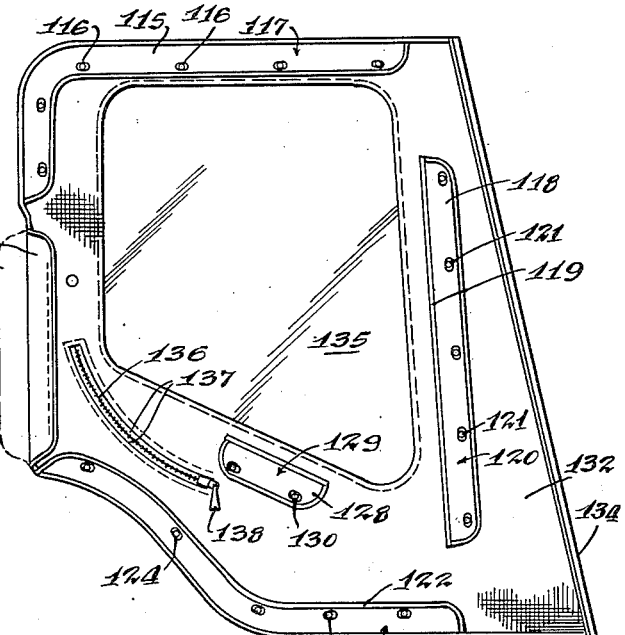
INVENTOR:
WILFRED BRIGHT
BY
Harry O. Ernsberger
ATTORNEY Patented June 29, 1954

2,682,427

UNITED STATES PATENT OFFICE 2,682,427

REMOVABLE COLLAPSIBLE VEHICLE DOOR CONSTRUCTION

Wilfred Bright, Toledo, Ohio, assignor, by mesne assignments, to Willys Motors, Inc., Toledo, Ohio, a corporation of Pennsylvania Application April 21, 1951, Serial No. 222,274

13 Claims. (Cl. 296—44)

1

This invention relates to removable vehicle closures and more especially to a removable door construction embodying a collapsible skeleton supporting a flexible covering or panel such as fabric, said closure when adjusted in place upon a vehicle forming a weather protection for the operator's compartment.

The invention embraces the provision of a readily removable door construction for vehicles having particular utility in closing the compartment occupied by the vehicle operator, the door construction being extremely light in weight and further characterized structurally by its simplicity, low cost of manufacture, ready adaptability, removability and collapsibility to permit it to be stored in a relatively small space when not in use.

The invention comprehends the provision of a vehicle door embodying a lightweight metallic skeleton frame preferably adapted to be covered by cloth, fabric, canvas or other flexible material, said door being arranged to be quickly and easily removed from a vehicle and whereby the frame may be collapsed and folded with said cover into a relatively small space without the use of tools.

A further object of the invention resides in the provision of a door formed with a collapsible supporting frame construction and flexible covering material, said supporting frame being readily collapsible when not in use, the cover or covering material being preferably permanently secured to one section or portion of the door frame to prevent a complete disassembly thereof, said cover when secured in a position of use upon said assembled frame serving to aid in maintaining the door construction in operative assembly and preventing said frame from collapsing notwithstanding the pivotal nature thereof.

A further object of the invention resides in the utilization of the door covering or panel when the collapsed frame is rolled therein to form a compact package of the entire unit frame and covering material which occupies a minimum space for convenient storage within the vehicle body.

Another object of the invention resides in the provision of a door with collapsible supporting frame construction covered by a suitable detachable covering or panel incorporating a plurality of pockets or portions adapted to embrace and retain sections of the frame in operative position, the covering incorporating a window formed of transparent material.

Still another object of the invention resides in the provision of simple and inexpensive means

2 associated with the door frame for latching the door structure in closed position with an adjacent vertical strut forming part of the top structure of the vehicle, said latching means being quickly releasable for purposes of entering or leaving the vehicle.

Still another object of the invention resides in the combination of a vehicle body and removable door construction wherein the body is formed with a rearwardly inclined windshield frame provided with suitable channel-shaped side members and hinge sockets, the removable doors each including a collapsible metallic frame provided with hinge pintles adapted to be received in the hinge sockets, a flexible fabric covering permanently secured to one portion of the door frame and adapted to be detachably assembled to the remaining portions of said frame when completely assembled, said covering when secured upon said assembled frame preventing said frame from collapsing notwithstanding the collapsible nature thereof, the covering having a window opening with a pane or panel of transparent material disposed in said opening.

Another object is the provision of a vehicle door covering formed with an opening which will permit the operator of the vehicle to extend his hand therethrough to give proper signals while driving, said signal opening having stringers of a separable fastener secured to its adjacent edge portions and formed with interlocking portions for coupling the stringers together whereby they are adapted to be coupled and uncoupled to close or open the signal opening as desired, said doors being easily attached in operable position, easily detachable when not in use, and the frame adapted to be collapsed and rolled into a small compass within its cover so that the package may be stored away within the vehicle body storage chamber.

Further objects and advantages are within the scope of this invention such as relate to the arrangement, operation and function of the related elements and to combinations of parts, elements per se, and to economies of manufacture and numerous other features as will be apparent from a consideration of the specification and drawing of a form of the invention, which may be preferred, in which:

Figure 1 is a fragmentary elevational view of a vehicle and body construction embodying the novel door of the invention and showing the door in a closed condition of use;

Figure 2 is a view similar to Figure 1 showing the door construction with the flexible covering or panel removed to illustrate structural features of the door frame;

Figure 3 is a side elevational view of the door assembly and a fragmentary portion of its supporting frame structure;

Figure 4 is an elevational view showing the interior side of the door panel or covering before its assembly with the door frame structure;

Figure 5 is a side view illustrating the skeleton door frame in folded or collapsed condition and showing a fragmentary portion of the door panel or covering in broken lines;

Figure 6 is an enlarged fragmentary horizontal sectional view taken substantially on line 6—6 of Figure 3;

Figure 7 is an enlarged horizontal sectional view taken substantially on line 7—7 of Figure 3;

Figure 8 is an enlarged fragmentary vertical sectional view taken substantially on line 8—8 of Figure 3;

Figure 9 is an enlarged fragmentary vertical sectional view taken substantially on line 9—9 of Figure 3;

Figure 10 is an enlarged vertical sectional view taken substantially on line 10—10 of Figure 1;

Figure 11 is an enlarged vertical sectional view taken substantially on line 11—11 of Figure 1;

Figure 12 is an enlarged horizontal sectional view taken substantially on line 12—12 of Figure 1;

Figure 13 is a side view of the pin type locking means shown in Figure 12;

Figure 14 is an enlarged horizontal sectional view taken substantially on line 14—14 of Figure 1;

Figure 15 is a side view of the rod and socket connection shown in Figure 14;

Figure 16 is a side view of the rod structure and connection shown in Figure 11, and Figure 17 is a top view of the rod structure and connection shown in Figure 16.

While I have illustrated the invention as particularly suitable for association with a particular type of vehicle body, it is to be understood that I contemplate the use of the invention with any construction wherever it may be found to have utility as a closure.

Referring to the drawings in detail, the vehicle construction illustrated is inclusive of a body portion 20, a cowl portion 21, a hood or bonnet construction 22, front fenders 23 and rear wheels 24. Secured to the cowl portion 21 is a main windshield frame 25 preferably supported for pivotal movement about pivot pins 25' and having the usual supplemental frame and glazed panes (not shown). Secured to the windshield frame 25 at each side thereof is a U-shaped channel member 26, one of which is shown in Figure 1, provided with inturned edge portions 27, said channel member 26 extending substantially the entire vertical length of the windshield frame. Secured to the body 20 directly beneath said channel member and in alignment therewith is a Z-shaped metal member 28 forming a vertical channel between its extended section and said body and forming, in effect, a continuation of the channel 26.

The vehicle body illustrated is adapted to be equipped with a folding top construction 30 which is inclusive of a rearwardly extending bow strut 31, shown in broken lines, the free ends of the bow strut being removably attachable to the side walls of the body construction by inserting the ends thereof in suitable sockets 32 disposed at each side of the body and securing same by means of winged screws 33 or other suitable means.

Connected to the bow 31 is a forwardly extending bow 34 to assist in supporting the flexible top 30 fabricated of canvas or other suitable material which extends horizontally from the top of the windshield frame, over the top bows 31 and 34 thence downwardly to the body 20, the bow 34 being pivotally secured to the lower end sections of bow 31 by means of hinges 35. The rear compartment of the vehicle 20 is enclosed by the rear depending portion of said top (not shown) and two side curtains 37 (one curtain only being shown in Figure 1), the upper portion of each side curtain being secured to the top portion 30 by releasable curtain fasteners 39 of conventional type while the lower portion of each curtain is secured to the body 20 by means of flexible straps 40. Each side curtain incorporates a glazed window 42 of the configuration shown in Figure 1. The top construction 30 including the bows 31 and 34 is arranged to be detached, collapsed and strapped to the body 20 when not required.

The invention is inclusive of a door construction and supporting means therefor, the door being of a character that may be quickly and readily secured to the vehicle. The door is of lightweight construction and includes a frame formed of a plurality of pivotally connected rods or frame members and a suitable flexible covering means or panel. The door is arranged to be quickly removable from the vehicle and collapsible per se for out-of-use storage. Secured to the upper portion of the windshield frame 25 at each side thereof is a metallic angle bracket 44 having a rearwardly extending ear portion 45 as shown in Figures 12 and 13, the ear portion 45 being bored provides an opening or socket adapted to receive the transversely extending end portion 46 of a rod 47 which extends horizontally and rearwardly of the windshield frame 25. The ear portion is also formed with a transversely extending portion 48 at its rearmost extremity adapted to fit into a socket or opening 49 formed in the uppermost vertical portion of bow 34. Thus a rod 47 provided at each side of the body forms an upper door rail as shown in Figures 1 and 2.

Secured to each side of the vehicle is a socket member 60 adapted to receive and support a vertically disposed post forming a vertical door post 50. Secured to the uppermost portion of each of said vertical posts 50 is a substantially U-shaped clip or bracket 51, the legs of which have curved extremities 52 and 53. The intermediate leg portions adjacent the bight end of bracket 51 provide parallel walls 55 and 56 arranged in horizontal planes. The walls 55 and 56 are formed with vertical aligned openings adapted to receive the upper end of the post 50. The curved end portions 52 and 53 of the bracket 51 are arranged to snap over the horizontally disposed rod 47 intermediate its ends in the manner shown in Figure 11 to form an anchor for the upper end of the post 50 and to maintain the portion 48 of rod 47 within socket 49 formed in bow 34 as shown in Figures 14 through 17.

Secured to the upper portion of the windshield frame 25 at each side thereof and below angle bracket 44 is a rearwardly extending metallic member 57 as shown in Figures 3 and 6. The rear extremity of the metal member is bent to form a socket 58 for supporting a door hinge pintle 59 as shown in Figure 6. On each side of the body adjacent the forward portion of the door opening is provided a socket 63 secured to the body and arranged to receive a pintle 61 formed on the lowermost end portion of a door frame member or rod 62, said pintle 61 forming the main support for the door construction as shown in Figure 2.

The door construction of the invention is inclusive of a skeleton frame 64 formed of a plurality of metal rods or members, which may be either tubular or solid, preferably of circular cross section. The frame includes a substantially vertical upright post or rod 62 having a tubular socket 65 permanently secured at its upper end, the lowermost end portion of the rod forming a pintle 61 adapted to be removably seated in the socket 63. Welded or otherwise secured to the upper end of the rod 62 and beneath the socket 65 is a member 66 formed with a hinge pintle 59 arranged to be received by and extend upwardly through said socket 58. Thus the door construction is arranged to be supported by rod 62 to swing about an axis aligned with the centers of the sockets 58 and 63 accommodating the pintles 59 and 61.

Juxtaposed and above the pintle 61 is provided a uniplanar bearing surface portion 68 formed by the rod being flattened for a short distance. The flattened portion 68 is bored to accommodate a bearing pin or rivet 69 which forms a pivotal connection for joining a flattened end portion 71 of rod 72 forming the lower rail of said frame 64 and a flattened end portion 73 of rod 74 to the rod 62 as shown in Figures 2, 3 and 8. The rod 72 is configurated or shaped to conform generally to the contour of the door frame 75, the rod 74 forming a diagonally disposed reinforcing strut or bracing member. The upwardly extending end 76 of rod 74 is preferably of circular cross section to slidably yet snugly fit into a socket provided in a member 77 which may be formed integral with or secured to the rod intermediate the ends 78 and 79 thereof, the rod 80 forming the rear vertical upright member of the frame 64. The end 78 is flattened and bored to accommodate a pin 81 whereby it is pivotally secured to the upwardly extending and flattened end 82 of rod 72, the flattened end being bored to receive the pin 81.

The upper end 79 of rod 80 is flattened and bored to receive a rivet or pin 83 whereby it is pivotally secured to the flattened and downwardly turned end 85 of the horizontally disposed rod 86, the latter forming the upper rail of the door frame 64. The rod 86 is formed at its forward end with a downwardly extending portion 88 of circular cross section, said end portion 88 being snugly and frictionally held within the socket 65 carried by the upper end of rod 62 as shown in Figures 2 and 9.

The door frame 64 is hinged to the body through the medium of the pintles 61 and 66; and when the frame elements are assembled in the relation shown in Figures 1, 2 and 3, a substantially rigid metal door frame is provided. When it is desired to remove the door frame from the vehicle and collapse the same to a position out-of-use, the operator moves the rod 86 about the pivot pin or rivet 83, slipping the end of the rod 86 out of the sleeve or socket 65. As soon as the end 88 of the rod 86 is free of the socket 65, both rod 86 and rod 80 may then be swung around the pivotal axis of pin 81 so that the socket 77 carried by the rod 80 will be withdrawn from telescoping engagement with the end 76 of the diagonally disposed bracing rod or strut 74. The lower rod 72, rod 74 and the vertical rod or post 62 may then be pivotally moved about the axis of the pin 69 whereby the entire door frame is folded or collapsed into a compact position illustrated in Figure 5 of the drawings.

A latching means holding the door construction in closed position is provided including a metal member 90 which is welded as at 87 or otherwise secured to the vertical frame rod 80 midway between its ends 78 and 79, and which projects forwardly therefrom. An opening is drilled in member 90 to receive a pin 91, the pin having its end portions formed with reduced tenons 92 and 93 of noncircular cross section. A handle portion 94 disposed on the inside of the door construction is carried by the tenon portion 92, the handle being held in place by a swaged portion 95. A second handle portion 96 disposed on the outside of the door is secured upon tenon portion 93 and held in place by swaged portion 97. It will be apparent that movement of either handle 94 or 96 moves both handles and pin 91 as a unit about the axis of the latter for latching and unlatching the door.

The member 90 is provided with an abutment or ear portion 98 shown in Figure 2, which forms a stop means for holding the handles 94 and 96 in substantially horizontal position for latching the door in closed position. The abutment 98 is also adapted to limit the position of handles 94 and 96 when they are moved to the position shown in broken lines in Figure 1 in order to release or unlatch the door construction. A rub plate 84 is suitably formed so that its rear portion will encircle rod 80 and press a portion of a canvas or fabric 111 tightly to the rod 80, the forwardly extending portion of which is formed with a pressed out circular portion 89 bored to accommodate the pin 91 and further to contact the portion of handle 96 adjacent said pin.

The canvas panel 99 of the foldable top 30 is secured forwardly by inserting its reinforced front edge portion into a horizontal channel secured to the top portion of the windshield frame. The top is stretched rearwardly over the transverse portion of bow 34 and detachably secured thereto by a flexible strap and button type means 110, the canvas panel 99 extending over the transverse portion of bow 31 thence downwardly to the body 20 to which it is detachably secured by means of straps and fasteners.

The skeleton door frame 64 of the invention formed by the metal rods 62, 75, 80 and 86 which define the perimeter of the door supports a fabric panel of canvas 111, reinforced resinous sheet material or some other suitable flexible material as shown in Figures 1, 3 and 4. The canvas covering or panel 111 is formed with a flap or folded extension 114 which is preferably permanently seamed or secured to the skeleton door frame 64 along one section only, that is, along rod 80 as indicated in dotted lines 112 in Figure 3. The door panel or covering has an extended edge portion or flap 115 which is arranged to be folded inwardly to form a pocket or casing 117 of a configuration to conform generally to the contour of the horizontal portion of rod 86 and its downward extension 88, the flap being secured in rod embracing position by a plurality of curtain fasteners 116 carried by the body portion of the panel and adapted to extend through suitable eyelets or grommets in said flap 115. When the fabric panel 111 is assembled upon the metal frame, said flap 117 embraces or encloses the greater portion of the rod 86.

The door panel or covering is provided with a vertically extending flap 118 which is sewed or otherwise secured to the panel 111 along its vertical and rearward edge 119. When the canvas 111 is assembled upon the entire frame, the flap 118 is folded around the rod 62 forming a closed pocket 120 and held in such condition by curtain fasteners 121. The door covering or panel has an extended portion or flap 122 along its lower edge which is adapted to be folded upwardly to form a pocket or casing 123 of a configuration to conform generally to the contour of the rod 72, said flap being retained in casing-forming position by a plurality of curtain fasteners 124 carried by the flap and adapted to extend through openings 125 in the door panel. The door panel is provided with an auxiliary flap 128 adapted to be folded downwardly to form a pocket or casing 129 to enclose a portion of rod 74 intermediate its ends, said flap being closed by a plurality of curtain fasteners 130 carried by the flap and extending through the openings 131 in the panel.

The flexible door panel 111 has a forwardly extending portion 132 which has a reinforcing bead or cord 133 embedded in the folded edge portion 134 thereof as shown in Figure 6. The reinforced edge portion is adapted to be slidably positioned within channel 26 secured to the windshield frame and held in place by the inwardly turned edge portions 27 of the channel 26. The door covering or panel is preferably formed with a window opening in which is disposed a transparent pane 135 of cellulose acetate or other suitable resinous film. The transparent pane 135 may be sewed in place or secured by other suitable means. The panel may be formed with a curved or arcuate opening 136 providing a hand opening for signaling purposes, said opening having stringers 137 of a separable fastener secured to its juxtaposed edge portions and formed with interlocking fingers for coupling the stringers together, such securing means being commonly referred to as a "zipper" fastener which may be readily coupled and uncoupled to close or open the signal opening by movement of an actuating element or runner 138 of conventional construction as shown in Figure 4.

It will be noted that when it is desired to remove and collapse one or both of the door units, this may be readily and quickly accomplished by first releasing the handles 94 and 96 from the door locking position by turning same to a vertical position and thereafter releasing the reinforced or beaded edge portion 134 of the door covering from the channel 26 and at the same time elevating the door construction until pintles 61 and 66 are withdrawn from the hinge sockets 58 and 63, respectively, such procedure completely disconnecting the door panel and supporting frame construction from the vehicle. Once the door construction is removed from the vehicle, and it is desired to collapse the same whereby it can be stored in a relatively small space, the operator first releases the frame bars 62, 72, 74, 80 and 86 from the closed curtain pockets or casings 117, 120, 123 and 129 by manipulating the curtain fasteners 116, 121, 124 and 130 to releasing position; secondly, the operator removes or withdraws the end 88 of rod 86 from the sleeve 65 by swinging the rod about the rivet or stub shaft 81 slightly upwardly whereby the socket 77 carried by the rod 80 may be withdrawn from the end 76 of the diagonally disposed frame rod 74. The lower rod 72, diagonal rod 74 and vertical rod 62 may then be pivotally moved about the axis of the pin 69 to bring them into compact relation as shown in Figure 5, the flexible panel 111 being still permanently secured to the lowermost section of rod 80. The rod 86 is swung about the axis of rivet or pin 83 to the position shown in Figure 5. The skeleton door frame 64 is thus in a completely collapsed or folded condition and the operator can now enclose the collapsed frame within the flexible cover or panel 111 by folding panel around the collapsed skeleton frame since both the panel and window pane 135 are of a flexible character. The door construction may thus be quickly and easily removed from the vehicle, collapsed, and wrapped within the panel without the use of tools and may be stored in a small space within the vehicle body.

The folding top construction 30 can be easily lowered to closed position to expose the rear vehicle compartment if desired. The side curtains may be removed by manipulating the curtain fasteners 39 to releasing position allowing the curtains to be removed and strapped to the vehicle body in rolled condition or completely removed therefrom. The top 30 may be lowered by sliding the reinforced or beaded front edge portion thereof from a horizontal channel mounted at the upper portion of the windshield frame. The button type fasteners 110 may be released so that the top 30 is free of the bow 34 whereby the entire top panel may be rolled upon itself and fastened by suitable straps (not shown) to the rear of the vehicle, or completely removed therefrom. Before the bows 31 and 34 can be lowered, rod 50 is removed from socket 60 and released from engagement with the rod 47. The rod 47 may then be released from angle bracket 44 and bow strut 34 and the latter released from the body by manipulating the screws 33, removing the end of bow 31 from socket 32, then pivotally swinging the bow 34 about hinge 35 and into parallelism with bow 34, after which both bows can be strapped to the horizontal top edge portion of the vehicle body by straps 40.

It will be apparent that applicant has devised a simple, inexpensive door construction which may be affixed in position upon a vehicle or quickly removed therefrom without the use of tools. The door frame, being formed of a plurality of metal rods, provides a lightweight skeleton construction for supporting a flexible panel in which the covering panel also serves to prevent collapsing of the metal frame when assembled in a position of use. As pointed out herein, the door frame may be quickly and easily disconnected from the hinge sockets, the frame collapsed to a small compass and the flexible panel folded or wrapped around the collapsed frame whereby the compacted door unit may be stored in a small space within the vehicle body.

It is apparent that, within the scope of the invention, modifications and different arrangements may be made other than is herein disclosed, and the present disclosure is illustrative merely, the invention comprehending all variations thereof.

What I claim is:

1. A door for a vehicle including a metallic collapsible frame of a nonrectangular configuration substantially defining the perimeter of the door; said frame comprising a plurality of pivotally connected rods; a sleeve engageable with end portions of two of the rods for maintaining the frame in door-forming position; a panel of flexible material permanently secured to one of said rods and detachably secured to other frame rods, said panel extending across the area defined by said frame when the latter is in door-forming position.

2. A door for a vehicle including a collapsible metallic frame including a plurality of pivotally connected rods forming a nonrectangular configuration substantially defining the perimeter of the door; one of said rods extending across the area defined by the remaining rods forming a reinforcing means for said door frame; the lower end of one of said rods forming a hinge pintle for said door; a second hinge pintle secured to said frame; said pintles being adapted for hingedly and removably connecting the door to a vehicle, and a panel of flexible material extending across the area defined by said frame, said panel being permanently secured to one of said rods and detachably secured to others of the remaining rods of said frame.

3. A lightweight door for vehicles including, in combination, a collapsible metallic skeleton frame; said frame being formed of a pair of spaced pillars; a bottom rail pivotally connected to both said pillars; a top rail pivotally connected to one of said pillars, said top rail having a removable connection with the other of said pillars; a reinforcing strut pivotally connected to one of said pillars and extending across the area defined by said frame and detachably secured to the second pillar; a hinge pintle welded to one of said pillars; said pillar having a pintle formed on its lower end; said pintles being adapted for hingedly connecting the door to a vehicle, and a covering of flexible material secured to the metallic frame.

4. A lightweight door for vehicles including, in combination, a collapsible metallic skeleton frame; said frame being formed of spaced pillars; a bottom rail pivotally connected to said pillars; a top rail pivotally connected to one of said pillars; a sleeve for removably joining the top rail to the other pillar; a reinforcing strut connected to said pillars and extending across the area defined by the pillars and top and bottom rails; a hinge pintle secured to the upper end portion of one of said pillars; the lower end of the said pillar being formed to provide a second pintle; said pintles being adapted for removably securing the door to a vehicle; a covering of flexible material secured to the metallic frame; a signal opening provided in said covering; and a separable fastener means for closing said signal opening.

5. A lightweight door for vehicles comprising a collapsible skeleton frame; said frame being formed of metal bars of substantially circular cross section; said bars providing a pair of spaced pillars, top and bottom rails; said bottom rail being pivotally connected to said pillars, said top rail being pivotally connected to one of said pillars and detachably connected to the other pillar forming a substantially rectangular frame, and a covering of flexible fabric carried by said metallic frame.

6. A lightweight door for vehicles comprising a collapsible skeleton frame of nonrectangular shape; said frame being formed of metal bars of substantially circular cross section; said bars providing a pair of spaced pillars and top and bottom rails; said rails being joined to said pillars to provide a collapsible substantially rectangular frame; a pair of hinge pintles formed on said frame; said pintles being adapted for hingedly connecting the door to the vehicle; reinforcing means for said door including a transversely extending bar pivotally connected to one of said pillars and detachably connected to the other pillar; and a covering of flexible fabric permanently secured to one pillar of said metallic frame and detachably secured to the other pillar and top and bottom rails.

7. In combination with a vehicle body provided with a pintle receiving socket and a windshield frame, a bracket having an opening secured to the windshield frame; a removable door including a collapsible skeleton metallic frame of nonrectangular shape composed of a plurality of pivotally connected rods; one of said rods being arranged in substantially vertical position; a sleeve for connecting said substantially vertical rod to another of said rods; a hinge pin welded to the upper portion of said vertical rod and adapted to be removably received in the opening in said bracket; the lower end of said vertical rod being removably received into said pintle receiving socket; a panel of flexible material secured to the skeleton door frame, and latch means permanently mounted upon said frame and adapted to contact an element of said vehicle to retain the door in closed position.

8. In combination with a vehicle body having a windshield frame and a door opening, a door adapted to close said opening; said door having a frame formed of a plurality of rods over which a flexible covering is mounted; said rods being pivotally connected one with another; a sleeve for connecting end portions of two of said rods; said covering being permanently secured to one of said rods; said covering having a plurality of pockets formed therewith; each of said pockets being arranged to detachably enclose others of said rods forming said frame; a bracket secured to the windshield frame; a hinge pintle secured to the upper portion of said frame to hingedly connect the door to said bracket; a pintle formed at the lower portion of said frame to pivotally support said door on the body; a substantially vertical strut mounted upon said body; and latch means permanently mounted upon said door and adapted for cooperation with said strut to retain the door in closed position.

9. A lightweight door for vehicles including in combination a collapsible metallic skeleton frame; said frame being formed of a plurality of rods; said rods comprising a pair of spaced pillars; a bottom rail pivotally connected to said pillars; a top rail pivotally joined to one of said pillars and detachably secured to the other of said pillars; a reinforcing strut pivotally connected at one end to one of said pillars; said strut being detachably secured at its free end to the other of said pillars; a covering of flexible material mounted upon said frame and permanently secured to one of said pillars; hinge means for detachably securing said door to said vehicle; said frame being adapted to be collapsed whereby the metal rods lie in juxtaposed relation when not in use; and said flexible covering adapted to be folded around said collapsed frame so that the door frame and covering may be stored when out of use.

10. A door for a vehicle including a frame formed of a pair of side rails and top and bottom rails substantially defining the perimeter of the door; the bottom rail being pivotally connected at its ends to the lower ends of said side rails; the top rail being pivoted at one end to the upper end of one of said side rails and having its free end detachably secured to the upper end of said other side rail; a reinforcing rod pivoted at one end to the lower end portion of one of said side rails and having its free end detachably secured to the said second side rail intermediate its upper and lower ends; and a fabric covering permanently secured to one of said rails and detachably secured to the remaining rails.

11. A lightweight door for vehicles including, in combination, a collapsible metallic skeleton frame of nonrectangular shape; said frame being formed of spaced pillars; top and bottom rails pivotally connected to one of said pillars; a reinforcing strut extending across the area defined by said frame and pivotally connected to one of said pillars; means for supporting the door including a pair of members; one of said members having a portion welded to one of said pillars; said member having an offset portion arranged in parallelism with said pillar supporting said member, said offset portion forming a hinge pintle for said door; one of said supporting members being formed from the lower end portion of the pillar providing a hinge pintle; a covering of flexible material permanently secured to one of said pillars and detachably secured to remaining portions of said skeleton frame; said covering provided with a signal opening; and said opening provided with slide fastener means for closing the same.

12. A door for a vehicle comprising a collapsible metallic frame substantially defining the perimeter of a generally trapezium-shaped door, said frame including a plurality of pivotally connected rods; means including a detachable connection joining the ends of two of said rods for maintaining the frame in door forming position, and a panel of flexible material permanently secured to one of said rods and detachably secured to the other rods of the frame, said panel extending across the area defined by said frame when the latter is in door forming position.

13. A door for a vehicle including a collapsible metallic frame substantially defining the perimeter of a generally trapezium-shaped door, said frame comprising a plurality of pivotally connected rods; means including a detachable connection joining end portions of two of the rods for maintaining the frame in door forming position; a reinforcing bar for said door frame extending across the area defined by said rods having one end articulately joined with one of said rods, said bar having a detachable connection with another of said rods, and a panel of flexible material secured to one of said rods and detachably secured to the other frame rods, said panel extending across the area defined by the frame when the latter is in door forming position.

References Cited in the file of this patent

UNITED STATES PATENTS

| Number | Name | Date |
| --- | --- | --- |
| 1,137,702 | Crawford | Apr. 27, 1915 |
| 1,753,795 | Linn et al. | Apr. 8, 1930 |
| 2,460,399 | Schassberger | Feb. 1, 1949 |
| 2,463,646 | Schassberger | Mar. 8, 1949 |
| 2,555,942 | Supplee | June 5, 1951 |
| 2,620,224 | Hedley | Dec. 2, 1952 |

FOREIGN PATENTS

| Number | Country | Date |
| --- | --- | --- |
| 85,549 | Austria | Sept. 10, 1921 |